US011822652B1

United States Patent
Mukherjee

(10) Patent No.: US 11,822,652 B1
(45) Date of Patent: *Nov. 21, 2023

(54) PRIME AND PROBE ATTACK MITIGATION

(71) Applicant: Marvell Asia Pte, Ltd., Singapore (SG)

(72) Inventor: Shubhendu Sekhar Mukherjee, Southborough, MA (US)

(73) Assignee: Marvell Asia Pte, Ltd., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 17/956,330

(22) Filed: Sep. 29, 2022

Related U.S. Application Data

(63) Continuation of application No. 17/001,806, filed on Aug. 25, 2020, now Pat. No. 11,487,874.

(60) Provisional application No. 62/944,263, filed on Dec. 5, 2019.

(51) Int. Cl.
*G06F 21/55* (2013.01)
*G06F 12/0877* (2016.01)
*G06F 12/0815* (2016.01)

(52) U.S. Cl.
CPC ........ *G06F 21/554* (2013.01); *G06F 12/0815* (2013.01); *G06F 12/0877* (2013.01); *G06F 2221/034* (2013.01)

(58) Field of Classification Search
None
See application file for complete search history.

(56) References Cited

U.S. PATENT DOCUMENTS

| 8,745,618 | B2 | 6/2014 | Lin et al. |
| 9,727,482 | B2* | 8/2017 | Steely, Jr. ............. G06F 12/128 |
| 9,779,028 | B1 | 10/2017 | Mukherjee et al. |
| 10,282,299 | B2 | 5/2019 | Mukherjee et al. |
| 10,540,181 | B2 | 1/2020 | Mukherjee et al. |
| 2005/0188158 | A1 | 8/2005 | Schubert |
| 2005/0268041 | A1 | 12/2005 | Yoshioka |
| 2008/0040554 | A1 | 2/2008 | Zhao et al. |
| 2008/0052467 | A1 | 2/2008 | Thompson |
| 2011/0225583 | A1 | 9/2011 | Suh et al. |
| 2013/0117838 | A1* | 5/2013 | Levin .................. G06F 11/3024 726/16 |
| 2015/0160960 | A1 | 6/2015 | Delco |
| 2020/0257639 | A1 | 8/2020 | Chamarty et al. |

* cited by examiner

*Primary Examiner* — Yaima Rigol
(74) *Attorney, Agent, or Firm* — Young Basile Hanlon & MacFarlane, P.C.

(57) ABSTRACT

Described herein are systems and methods for prime and probe attack mitigation. For example, some methods include, responsive to a cache miss caused by a process, checking whether a priority level of the process satisfies a first priority requirement of a first cache block of a cache with multiple ways including cache blocks associated with respective priority requirements; responsive to the priority level satisfying the first priority requirement, loading the first cache block; and, responsive to the priority level satisfying the first priority requirement, updating the first priority requirement to be equal to the priority level of the process.

22 Claims, 6 Drawing Sheets

PRIME AND PROBE ATTACK MITIGATION

CROSS-REFERENCE TO RELATED APPLICATION(S)

This application is a continuation of U.S. application patent Ser. No. 17/001,806, filed Aug. 25, 2020, which claims priority to and the benefit of U.S. Provisional Application Patent Ser. No. 62/944,263, filed Dec. 5, 2019, each of which is incorporated herein by reference.

TECHNICAL FIELD

This disclosure relates to prime and probe attack mitigation.

BACKGROUND

A processor pipeline includes multiple stages through which instructions advance, a cycle at a time. In a scalar processor, instructions proceed one-by-one through the pipeline, with at most a single instruction being committed per cycle. In a superscalar processor, multiple instructions may proceed through the same pipeline stage at the same time, allowing more than one instruction to issue per cycle, depending on certain conditions (called hazards), up to an issue width. Some processors issue instructions in-order (according to a program order), with consecutive instructions proceeding through the pipeline in program order. Other processors allow instructions to be reordered and issued out-of-order, which potentially increases overall pipeline throughput. If reordering is allowed, instructions can be reordered within a sliding instruction window (whose size can be larger than the issue width), and a reorder buffer can be used to temporarily store results (and other information) associated with instructions in the instruction window to enable the instructions to be committed in-order (potentially allowing multiple instructions to be committed in the same cycle as long as they are contiguous in the program order).

SUMMARY

Disclosed herein are implementations of prime and probe attack mitigation.

One aspect, in general, of the disclosed implementations is an integrated circuit for executing instructions, comprising: a cache with multiple ways including cache blocks associated with respective priority requirements; a data storage circuitry configured to store a priority level of a process; and in which the integrated circuit is configured to: responsive to a cache miss caused by the process, check whether the priority level of the process satisfies a first priority requirement of a first cache block of the cache; responsive to the priority level satisfying the first priority requirement, load the first cache block; and, responsive to the priority level satisfying the first priority requirement, update the first priority requirement to be equal to the priority level of the process.

Aspects can include one or more of the following features.

The integrated circuit is configured to: check whether the priority level of the process satisfies a second priority requirement of a second cache block of the cache; and responsive to the priority level not satisfying the second priority requirement, prevent loading of the second cache block.

The priority level of the process is a number stored in a tuple of bits of the data storage circuitry, and the first priority requirement is a number stored in a tuple of bits in a cache entry including the first cache block.

The priority level of the process satisfies the first priority requirement by having a value greater than or equal to a value of the first priority requirement.

The process is a first process and the integrated circuit is configured to update the priority level of the first process stored in the data storage circuitry based on an instruction of a second process that has a higher priority than the first process.

The second process is a hypervisor process.

The second process is an operating system process.

The integrated circuit is configured to: responsive to the priority level not satisfying priority requirements for all cache blocks of a set of the cache, flush cache blocks of the cache and reset corresponding priority requirements to indicate low priority.

All cache blocks of a way of the cache are flushed.

All cache blocks of the set of the cache are flushed.

The cache is an L1 cache of a processor core of the integrated circuit.

The data storage circuitry is a process state register storing a state of the process.

Another aspect, in general, of the disclosed implementations is method that includes: responsive to a cache miss caused by a process, checking whether a priority level of the process satisfies a first priority requirement of a first cache block of a cache with multiple ways including cache blocks associated with respective priority requirements; responsive to the priority level satisfying the first priority requirement, loading the first cache block; and, responsive to the priority level satisfying the first priority requirement, updating the first priority requirement to be equal to the priority level of the process.

Aspects can include one or more of the following features.

The method further comprises checking whether the priority level of the process satisfies a second priority requirement of a second cache block of the cache; and responsive to the priority level not satisfying the second priority requirement, preventing loading of the second cache block.

The priority level of the process is a number stored in a tuple of bits of a data storage circuitry, and the first priority requirement is a number stored in a tuple of bits in a cache entry including the first cache block.

The priority level of the process satisfies the first priority requirement by having a value greater than or equal to a value of the first priority requirement.

The process is a first process, and the method further comprises: updating the priority level of the first process stored in a data storage circuitry based on an instruction of a second process that has a higher priority than the first process.

The second process is a hypervisor process.

The second process is an operating system process.

The method further comprises, responsive to the priority level not satisfying priority requirements for all cache blocks of a set of the cache, flushing cache blocks of the cache and resetting corresponding priority requirements to indicate low priority.

All cache blocks of a way of the cache are flushed.

All cache blocks of the set of the cache are flushed.

Another aspect, in general, of the disclosed implementations is an integrated circuit for executing instructions, comprising: a cache with multiple ways including cache blocks associated with respective priority requirements; a data storage circuitry configured to store a priority level of a process; and in which the integrated circuit is configured to: responsive to a cache miss caused by the process, check whether the priority level of the process satisfies a first priority requirement of a first cache block of the cache; and, responsive to the priority level not satisfying the first priority requirement, prevent loading of the first cache block.

Aspects can include the following feature.

The priority level of the process is a number stored in a tuple of bits of the data storage circuitry, and the first priority requirement is a number stored in a tuple of bits in a cache entry including the first cache block.

These and other aspects of this disclosure are disclosed in the following detailed description of the implementations, the appended claims and the accompanying figures.

BRIEF DESCRIPTION OF THE DRAWINGS

The disclosure is best understood from the following detailed description when read in conjunction with the accompanying drawings, wherein like reference numerals refer to like parts throughout the several views. It is emphasized that, according to common practice, the various features of the drawings are not to-scale. On the contrary, the dimensions of the various features are arbitrarily expanded or reduced for clarity.

DETAILED DESCRIPTION

Figure 1:
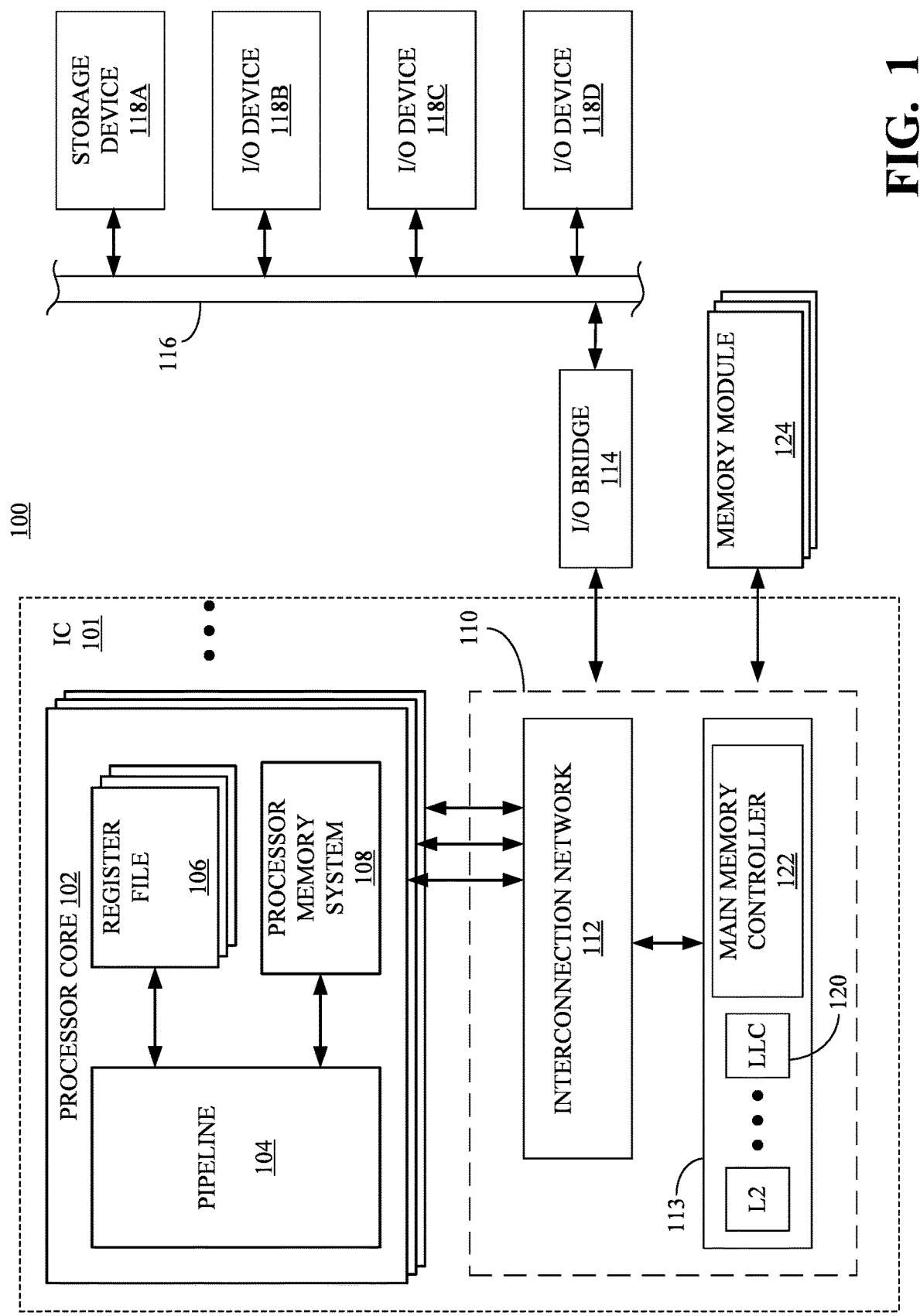
FIG. 1 is a high-level block diagram of an example of a computing system 100.

Described herein are systems and methods for prime and probe attack mitigation. Implementations may use of right-to-replace (R2R) priority information to protect against prime and probe side-channel attacks in a shared cache.

Side-channel attacks on Simultaneous Multithreading (SMT) processors have been discovered. A side-channel attack is one in which a spy can discover information about a victim entity using knowledge of the implementation, rather than weakness in implemented algorithm itself. For example, if a spy can discover what instructions are executing on a victim process in a computer system by measuring timing information about the spy itself, then it would be considered a side-channel attack. Prime and probe attacks are a standard form of side-channel attacks where a spy process can infer which physical addresses a victim process is using. The attack works as follows. For example, consider a cache with N sets×M ways with cache blocks of size B (where a cache block can include a number of words of data, and a block offset is used to select a particular word from the cache block). The total size of the cache is N×M×B. The cache is a shared cache between a spy and a victim. For example, the physical address may be segmented as follows:

<upper bits><log 2(N)><log 2(B)>

To see which sets, and thereby determine part of the address, a victim process is accessing, a spy process will write the entire cache with its own cache blocks. Then, the victim executes and uses the cache. Then, the spy will time how long it takes for it to access its own cache blocks. If the victim has displaced the spy's cache block, then time to access that cache block will be higher because it has to access a higher-level cache or memory (e.g., double data rate (DDR) memory). However, if the cache block access time is not higher, then it would be a cache hit for the spy and the spy can infer that the victim process didn't displace that cache block. Such attacks are typically used to infer kernel physical addresses (victim) by a user spy process.

To disallow a spy process from displacing a victim process' cache blocks, a system can partition the cache by ways. For example, if there are M ways, M/2 ways can be allocated to the victim and M/2 to the spy. The problem is that this increases conflict misses in the shared cache, thereby reducing performance. This also causes underutilization of the cache by doing a hard partition. Further with many processes executing, it may be difficult to determine what the optimal way allocation per process should be.

Some implementations disclosed herein associate (e.g., attach) a right-to-replace and right-to-be-replaced tuple of one or more bits (e.g., a vector of bits) to a cache block as it is installed into a shared cache. For example, a tuple of bits may include four bits, which allows 16 levels of priorities. For example, a shared cache may have four ways with the following right/priority levels:

Way 0: right 0
Way 1: right 4
Way 2: right 7
Way 3: right 15

In an example scenario, a cache block with right level 8 is requested. When this cache block with level 8 is installed, it can only displace blocks from Way 0, 1, or 2, but not Way 3 because Way 3 has a higher priority level (15) compared to 8. In some implementations, a high privilege software, such as an operating system process and/or a hypervisor process, may assign higher level rights to preferred software processes. In contrast, user processes, and particularly those deemed risky, can be assigned lower level rights. Thus, if a spy process cannot replace cache blocks of a victim process, the spy process cannot perform the prime and probe attack.

The systems and techniques described herein may provide advantages over conventional systems and techniques, such as, for example, providing a clean way to prevent or mitigate the prime and probe attacks by allowing an operating system or hypervisor to implement policies using primitives provided by hardware (e.g., right-to-replace cache priority levels for processes).

Figure 2:
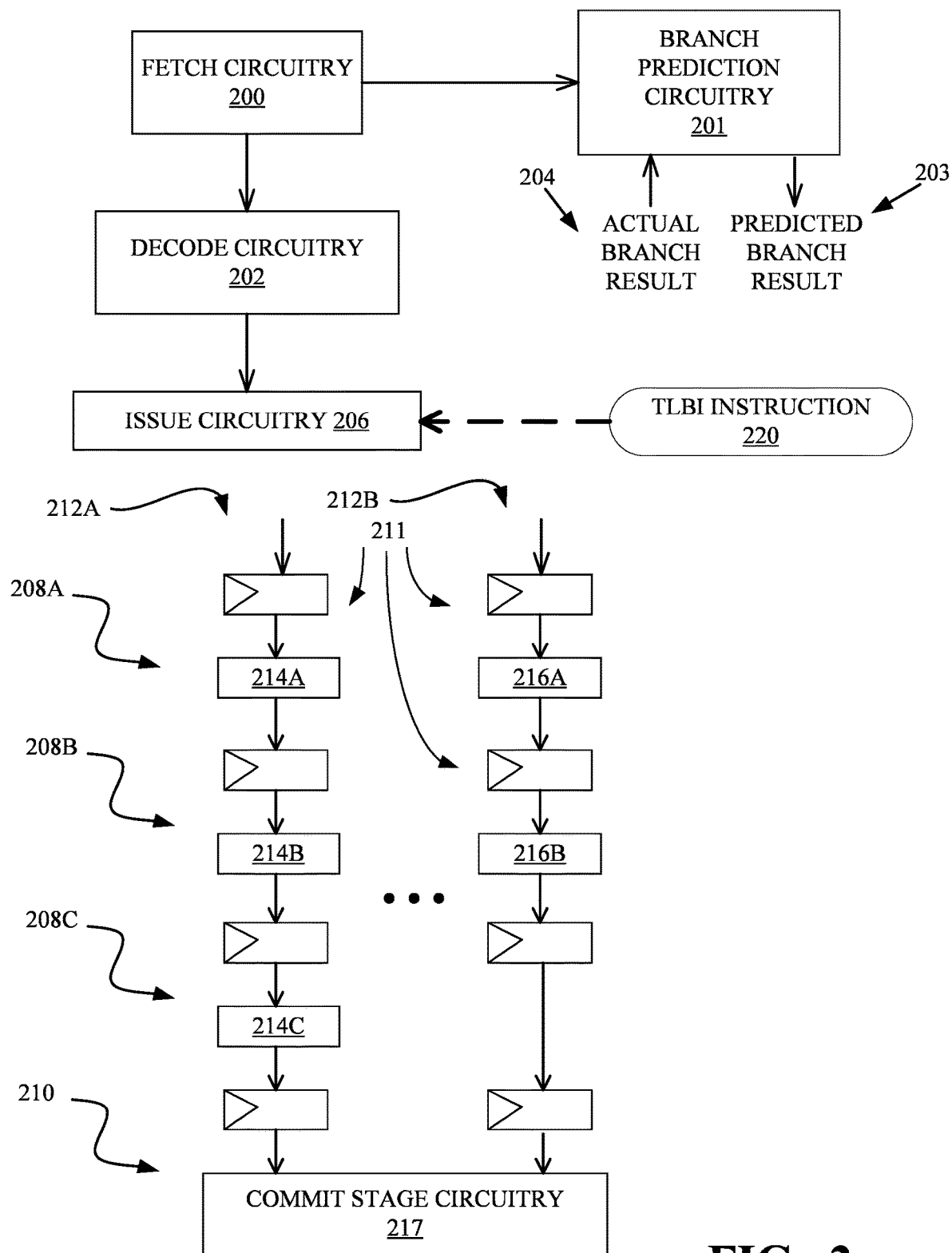
FIG. 2 is an example of a configuration of the pipeline of FIG. 1.
Figure 3:
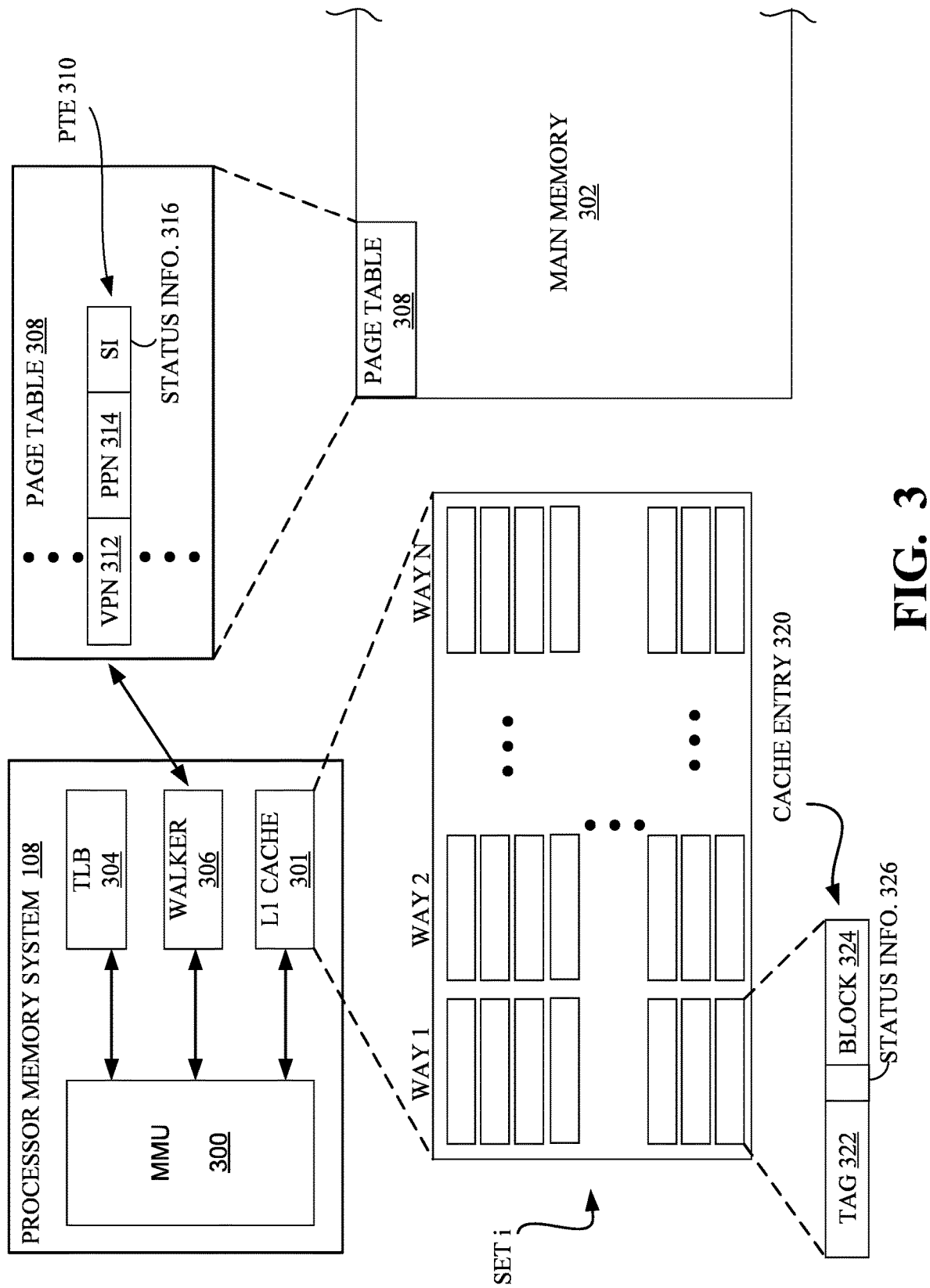
FIG. 3 is an example of a configuration of the processor memory system of FIG. 1.

Further details of techniques for prime and probe attack mitigation are described herein with initial reference to a system in which they can be implemented, as shown in FIGS. 1 through 3.

FIG. 1 is a high-level block diagram of an example of a computing system 100. The computing system 100 includes an integrated circuit 101 with at least one processor core 102, which can be a single central processing unit (CPU) or one of multiple processor cores in a multi-core architecture. In a multi-core architecture each processor core (or simply "core") can include an individual CPU with associated circuitry. In this example of a multi-core architecture, each processor core 102 can include a processor pipeline 104, one or more register files 106, and a processor memory system 108. Each register file of the register files 106 can include one or more individually addressable registers. For example, the register files 106 may include the data storage apparatus 620 storing the right-to-replace priority level 622 of FIG. 6. The integrated circuit 101 may be configured for mitigation of prime and probe attacks. For example, the integrated circuit 101 may be used to implement the technique 400 of FIG. 4

Each processor core 102 can be connected to an uncore 110. The uncore 110 can include an interconnection network 112 and an external memory system 113. The interconnection network 112 can be a bus, a cross-bar switch, a mesh network, or some other interconnection network. The interconnection network 112 can enable communication between each processor core 102 and an external memory system 113 and/or an input/output (I/O) bridge 114.

The I/O bridge 114 can enable communication, such as over an I/O bus 116, with various different I/O devices including a storage device 118A and other I/O devices 118B-118D. Non-limiting examples of the other I/O devices 118B-118D can include a network interface, a display adapter, or user input devices such as a keyboard or a mouse.

The storage device 118A can be a disk drive or some other large capacity storage device. The storage device 118A can typically be a non-volatile storage device. In some examples, the storage device 118A, or a portion thereof, can be used in a virtual memory scheme. For example, a portion of the storage device 118A can serve as secondary storage (or a 'backing store') in a virtual memory scheme for the (typically volatile and/or capacity-limited) main memory. Examples of main memory include the processor memory system 108 or an external memory system, such as described below with respect to an external memory system 113.

The processor memory system 108 and the external memory system 113 together form a hierarchical memory system. The hierarchy can include any number of levels. The levels may be denoted or referred to as L1, L2, ..., LN. The L1 level is a lower level memory than the L2 memory system, which in turn is a lower level than the L2 memory system, and so on. Typically, each level of the hierarchical memory system can include memory (e.g., a memory system) that is slower to access than that of the immediately lower level and/or each level of the hierarchical memory system can include memory (e.g., a memory system) that is faster to access, more limited in capacity, and/or more expensive than that of a higher level. Each level of the hierarchical memory system can serve as a cache.

A first level (L1) cache can be within (e.g., a part of) the processor memory system 108. Any number of higher level (L2, L3, ...) caches can be within the external memory system 113. The highest (i.e., last) level cache within the external memory system 113 can be referred to as the last level cache (LLC). In an example, the LLC can be the L2 cache.

At each level, the cache can include a first module that provides an instruction cache for caching instructions and a second module that provides a data cache for caching data. The memory system of a level of the hierarchical memory system can load blocks of instructions or data into entries and evict (e.g., removes, over-writes, etc.) blocks of instructions or data from entries in units cache blocks (also called cache lines). Cache lines are further described with respect to FIG. 3.

In addition to the L1 instruction cache and data cache, the processor memory system 108 can include a translation lookaside buffer (TLB) for caching recent translations, and various other circuitry for handling a miss in the L1 instruction or data caches or in the TLB. For example, that circuitry in the processor memory system 108 of a processor core 102 can include a write buffer for temporarily holding values to be written from a store instruction being executed within the pipeline 104. The TLB is further described with respect to FIG. 3.

As already mentioned, the highest level cache within the external memory system 113 is the LLC (such as an LLC 120). The LLC 120 can be accessed (e.g., searched, etc.) just before main memory. Of course, this is only an example. The exact division between which level caches are within the processor memory system 108 and which are in the external memory system 113 can be different in other examples. For example, the L1 cache and the L2 cache can both be internal to the processor core 102 (i.e., part of the processor memory system 108) and the L3 (and higher) caches can be external to the processor core 102.

In an example, each processor core 102 can have its own internal L1 cache, and the processor cores can share an L2 cache. The external memory system 113 can also include a main memory controller 122. The main memory controller 122 can be connected to any number of memory modules 124. Each of the memory modules 124 can serve as (e.g., can be) the main memory. In a non-limiting example, one or more of the memory modules 124 can be Dynamic Random Access Memory (DRAM) modules.

In a typical example, the content of a memory address is searched for in a level (e.g., L1) of the hierarchical memory system. If not found, then the next higher level (e.g., L2) is searched; and so on. Searching for a memory address amounts to answering the question: does this memory level of the hierarchical memory system include the content of the memory address? Or, alternatively, is the memory address cached in this memory of the hierarchical memory system?

That is, in a particular cache level of the hierarchy of the hierarchical memory system, each cache entry includes space for storing the data words of a particular memory block along with bits for determining whether a particular word from a memory block is present in that cache level (i.e., a 'hit') or not present in that cache level (i.e., a 'miss'). After a miss in one level, the cache system attempts to access (i.e., read or write) the memory block from a higher level cache, or from the main memory (in the case of a miss in the LLC).

The pipeline 104 can include multiple stages through which instructions advance, a cycle at a time. The stages can include an instruction fetch (IF) stage or stages, an instruction decode (ID) stage or stages, an operand fetch (OF) stage or stages, an instruction execution (IE) stage or stages, and/or a write back (WB) stage or stages. The pipeline can include other stages, as further described with respect to FIG. 2. Some stages occur in a front-end portion of the pipeline. Some other stages occur in a back-end portion of the pipeline. The front-end portion can include pre-execution stages. The back-end portion of the pipeline can include execution and post-execution stages. The pipeline 104 is further described with respect to FIG. 2.

First, an instruction is fetched (e.g., in the IF stage or stages). An instruction can be fetched based on a program counter (PC). The PC is a pointer that can be used to identify instructions within memory (e.g., within a portion of the main memory, or within an instruction cache of the core 102). The PC can advance through addresses of a block of compiled instructions (called a "basic block"). The PC can be incremented by a particular number of bytes. The particular number of bytes for incrementing the PC can depend on how long (e.g., in bytes) each instruction is and on how many instructions are fetched at a time.

After being fetched, the instruction is then decoded (e.g., in the ID stage or stages) to determine an operation and one or more operands. Alternatively, in some pipelines, the IF and ID stages can overlap. If the instruction includes operands, the operands are fetched (e.g., in the OF stage or stages).

The instruction is then ready to be issued. Issuing an instruction starts progression of the instruction through stages in a back-end portion of the pipeline to execute the instruction. In an example, execution of the instruction can involve applying the operation of the instruction to the operand(s) to produce a result for an arithmetic logic unit (ALU) instruction. In an example, execution of the instruction can involve storing or loading to or from a memory address for a memory instruction. In an example, execution of the instruction can involve evaluating a condition of a conditional branch instruction to determine whether or not the branch should be taken.

After an instruction has completed execution, the instruction can be committed so that any effect of the instruction is made globally visible to software. Committing an instruction may involve storing a result in a register file (e.g., in the WB stage or stages), for example. In most implementations, even if any instructions were issued out-of-order, all instructions are generally committed in-order.

FIG. 2 is an example of a configuration of the pipeline 104 of FIG. 1.

The pipeline 104 can include circuitry for the various stages (e.g., the IF, ID, and OF stages). For one or more instruction fetch stages, an instruction fetch circuitry 200 provides a PC to an instruction cache in a processor memory system, such as the processor memory system 108 of FIG. 1, to fetch (e.g., retrieve, read, etc.) instructions to be fed (e.g., provided to, etc.) into the pipeline 104. For example, the PC can be a virtual address of the next instruction, in which case the PC can be incremented by the length of a virtual address in the case of sequential execution (i.e., without taking any branches). Virtual addresses are described with respect to FIG. 3.

The instruction fetch circuitry 200 can also provide the program counter, PC, to a branch prediction circuitry 201. The branch prediction circuitry 201 can be used to provide a predicted branch result 203 for branch instructions. The predicted branch result 203 enables the pipeline 104 to continue executing speculatively while an actual branch result 205 is being determined. The branch prediction circuitry 201 can also store branch history information that is updated based on receiving the actual branch result 204. In some implementations, some or all of the branch prediction circuitry 201 can be considered to be a part of the instruction fetch circuitry 200.

In an the out-of-order execution, for one or more instruction decode (ID) stages, instruction decode circuitry 202 can store information in an issue queue for instructions in an instruction window waiting to be issued. The issue queue (which can also be referred to as an instruction queue) is such that an instruction in the queue can leave the queue when the operands of the instruction become available. As such, the instruction can leave before earlier (e.g., older) instructions in a program being executed. The instruction window refers to a set of instructions that can execute out-of-order.

An issue circuitry 206 can determine a respective cycle in which each of the instructions in the issue queue are to be issued. Issuing an instruction makes the instruction available to progress through circuitry of instruction execution (IE) stages, such as a first execution stage 208A, a second execution stage 208B, and a third execution stage 208C, of the pipeline 104. For simplicity of explanation, only three execution stages are illustrated in FIG. 2. However, the disclosure herein is not so limited: more or fewer execution stages are possible.

The pipeline 104 can include one more commit stages, such as a commit stage 210. A commit stage commits (e.g., writes to memory) results of instructions that have made their way through the IE states 208A, 208B, and 208C. For example, a commit stage circuitry 217 may write back a result into a register file, such as the register file 106 of FIG. 1. However, some instructions may not be committed by the commit stage circuitry 217; Instead the results of the instructions may be committed by other circuitry, such as circuitry in another stage of the back-end or a stage of the front-end, possibly based on information from the commit stage.

Between adjacent stages of the pipeline 104, the various paths through the pipeline circuitry include pipeline registers. For example, shown in FIG. 2 are pipeline registers 211 for the IE stages 208A, 208B, and 208C. The pipeline registers can be used for storing results of an upstream stage to be passed downstream to a next stage. The pipeline registers 211 may be clocked by (i.e., receive a clock signal derived from) a common clock (not shown). Thus, each clock cycle, each pipeline register 211 (also called a latch, or a set of flip-flops) can pass a result from its input to its output and becomes ready to receive a new result in its input after that result has been produced by the circuitry of that stage.

There may be multiple separate paths through the IE stages. The IE stages can include various circuitry for executing different types of instructions. For illustration purposes, only two paths 208A and 208B are shown in FIG. 2. However, the execution stages can include any number of paths with corresponding circuitry, which can be separated by pipeline registers, such as the pipeline registers 211.

The number of paths through the instruction execution stages can generally be dependent on the specific architecture. In an example, enough paths can be included such that a number of instructions up to a maximum number of instructions that can progress through the same execution stages in the same cycles. The maximum number of instructions that can progress through the same execution stages in the same cycles can be referred to as the issue width.

The number of stages that include functional circuitry for a given path may also differ. In the example of FIG. 2, a first path 212A includes functional circuitry 214A, 214B, and 214C located in the first execution stage 208A, the second execution stage 208B, and the third execution stage 208C, respectively. The second path 212B includes functional circuitry 216A and 216B located in the first execution stage 208A and the second execution stage 208B, respectively. In the second path 212B, the third execution stage 208C is a "silo stage" that passes a result along without performing further computation thereby ensuring that each path passes through the same number of stages through the pipeline.

In an example, a path can include circuitry for executing instructions using units for various operations (e.g., ALU, multiplier, floating point unit, etc.). In an example, another path can include circuitry for executing memory access instructions. The memory access instructions can include load instructions that read data values from the memory system. The memory access instructions can include store instructions to write data values to the memory system. The circuitry for executing memory access instructions can also initiate translation of virtual addresses to physical addresses, when necessary, as described in more detail below with respect to FIG. 3.

In addition to branch prediction, as described with respect to the branch prediction circuitry 201, the pipeline 104 can be configured to perform other types of speculative execution. In an example of another type of speculative execution, the pipeline 104 can be configured to reduce the chance of stalling (such as in the event of a cache miss) by prefetching. Stalling refers to the situation in which processor execution of instructions is stopped/paused.

A prefetch request can be used to preload a cache level (e.g., of a data cache) so that a future memory request is likely to hit in that cache level instead of having to access a higher cache level or a main memory. For example, a speculative memory access request can include prefetch requests that are sent to preload an instruction cache or data cache based on a predicted access pattern.

A prefetch request can be or can include a software prefetch request such that an explicit prefetch instruction that is inserted into the pipeline 104 includes a particular address to be prefetched. A prefetch request can be or can include a hardware prefetch that is performed by hardware within the processor (e.g., the processor core 102) without an explicit prefetch instruction being inserted into its pipeline (e.g., the pipeline 104).

In some cases, prefetching can include recognizing a pattern (e.g., a stream) within the memory accesses of a program, or can include speculatively performing a load instruction within a program (e.g., using a speculative address for that load instruction) before that load instruction is actually issued as part of program execution.

Various types of external instructions can be received from other processor cores. Such externally received instructions can be inserted into the pipeline 104 by the issue circuitry 206 to be handled at the appropriate stage. An example of such an externally received instruction is a TLB invalidation (TLBI) instruction 220 for invalidating entries in the TLB of that particular processor core (i.e., the receiving core). Another example of an external instruction that can be received is a GlobalSync instruction, which may be broadcast to processor cores as a side effect of a memory barrier operation performed by a processor core to ensure that the effects of any previously broadcast TLBIs have been completed. Said another way, an originating processor core that issues a broadcast TLBI instruction can subsequently issue a data synchronization barrier (DSB) instruction, which in turn causes GlobalSync instructions to be received by every other processor core. In response to the GlobalSync instruction, when a receiving processor core completes the TLBI instruction, the receiving processor core sends, or causes to be sent, an acknowledgement to the originating process core. Once the originating process core receives acknowledgements from all receiving processor cores, the originating process core can proceed with instruction execution.

FIG. 3 is an example of a configuration of the processor memory system 108 of FIG. 1. In example illustrated in FIG. 3, the processor memory system 108 includes a memory management unit (MMU) 300 that manages access to the memory system. The MMU 300 can manage the translation of virtual addresses to physical addresses.

In some implementations, the MMU 300 can determine whether a copy of a stored value (e.g., data or an instruction) at a given virtual address is present in any of the levels of the hierarchical cache system, such as in any of the levels from an L1 cache 301 up to the LLC 120 (FIG. 1) if necessary. If so, then the instruction accessing that virtual address can be executed using a cached copy of the value associated with that address. If not, then that instruction can be handled by miss circuitry to be executed after accessing the value from a main memory 302.

The main memory 302, and potentially one or more levels of the cache system, may need to be accessed using a physical address (PA) translated from the virtual address (VA). To this end, the processor memory system 108 can include a TLB 304 that stores translations, defined by VA-to-PA mappings, and a page table walker 306 for accessing a page table 308 if a translation is not found in the TLB 304. The translations stored in the TLB can include recently accessed translations, likely to be accessed translations, some other types of translations, or a combination thereof.

The page table 308 can store entries, including a page table entry (PTE) 310, that contain all of the VA-to-PA mappings currently in use. The page table 308 can typically be stored in the main memory 302 along with physical memory pages that represent corresponding mapped virtual memory pages that have been "paged in" from secondary storage (e.g., the storage device 118A of FIG. 1).

A memory page can include a number of cache blocks. A cache block can include a number of words. A word is of a predetermined number (e.g., 2) of bytes. A byte is a group of bits (e.g., 8 bits), which can be operated on as a unit. A byte can be considered a unit of memory size.

Alternatively, in a virtualized system with one or more guest operating systems managed by a hypervisor, virtual addresses (VAs) may be translated to intermediate physical addresses (IPAs), which are then translated to physical addresses (PAs). In a virtualized system, the translation by a guest operating system of VAs to IPAs may be handled entirely in software, or the guest operating system may have some hardware assistance from the MMU 300.

The TLB 304 can be used for caching recently accessed PTEs from the page table 308. The caching of recently accessed PTEs can enable the translation to be performed (such as in response to a load or a store instruction) without the page table walker 306 having to perform a potentially multi-level page table walk of a multiple-level data structure storing the page table 308 to retrieve the PTE 310. In an example, the PTE 310 of the page table 308 can store a virtual page number 312 and a physical page number 314, which together serve as a mapping between a VA and a PA that defines a translation of that VA.

An address (i.e., a memory address) can be a collection of bits. The bits of the memory address can be divided into low-order bits and high-order bits. For example, assuming 32-bit addresses, an example of a memory address is 01101001 00101000 00001101 01011100. The low-order bits are the rightmost 16 bits (i.e., 00001101 01011100); and the high-order bit are the leftmost 16 bits (i.e., 01101001 00101000). The low-order bits of a memory address can be used as a page offset. The low-order bits can be identical for a VA and its mapped PA. Thus, the high-order bits of a memory address can be used as a memory page number to specify the mapping.

The PTE 310 can also include status information (SI) 316. The SI 316 can indicate whether or not the page is resident in the main memory 302 or whether the page should be retrieved from secondary storage. When the PTE 310 is stored in an entry of any of the TLB 304, there may also be additional information for managing the transfer of PTEs between the page table 308 and the TLB 304, and for invalidating PTEs in the TLB 304. In an example, invalidating PTEs in the TLB 304 can be accomplished by toggling a bit (that indicates whether the entry is valid or not) to a state (i.e., a binary state) that indicates that the entry is invalid. However, other ways of invalidating PTEs are possible.

If a valid entry in the TLB 304 that matches with a portion of a VA to be translated is found (i.e., a "TLB hit"), then the PTE stored in that entry is used for translation. If there is no match (i.e., a "TLB miss"), then the page table walker 306 can traverse (or "walk") the levels of the page table 308 retrieve a PTE.

The L1 cache 301 can be implemented in any number of possible ways. In the implementation illustrated in FIG. 3, the L1 cache 301 is illustrated as being implemented as an N-way set associative cache module. Each cache entry 320 of the L1 cache 301 can include bits for storing a particular cache block 324 that has been copied from a physical page in the main memory 302 (possibly via higher level cache module).

The cache entry 320 can also include bits for storing a tag 322. The tag 322 can be made up of a number of the most significant bits of a virtual address, which are common to the words of that entry. For a virtually indexed, virtually tagged (VIVT) type of cache module, in addition to comparing a tag portion of a virtual address of desired data, the cache module can compare an index portion of the virtual address (which can be made up of middle bits between the tag and a block offset) to determine which of multiple sets may have a cache entry containing those desired data.

For an N-way set associative cache, the tag comparison can be performed N times (possibly in parallel) for the selected "set" (i). The comparison can be performed once for each of N "ways" in which a cache block containing the desired data may be stored.

The block offset can then be used to select a particular word from a cache block that is found in the cache entry (i.e., a 'cache hit'). If the tag does not match for any of the ways of the selected set (i.e., a 'cache miss'), then the cache system can attempt to retrieve the cache block from a higher level cache or from the main memory 302 (in the case of the LLC). The cache entry 320 can also include bits for storing status information 326. The status information 326 can include, for example, a valid bit and/or any flags or error correction bits and/or a priority requirement as described in relation to FIGS. 4-6.

When establishing a translation from a particular virtual address to a particular physical address or to an intermediate physical address, various types of context information can be used to distinguish otherwise identical virtual addresses from each other. The context information can enable multiple independent virtual address spaces to exist for different processes or different virtual machines or any of a variety of other differentiating characteristics that support different virtual address spaces.

Various portions of the context information can be used for differentiating between virtual addresses that are in use within different VA-to-PA translations, or in the case that intermediate physical addresses (IPAs) are used, VA-to-IPA translations, or IPA-to-PA translations.

For example, an operating system can use an address space identifier (ASID) (e.g., 16 bits) to identify a memory space (a virtual address space) associated with a running process. A hypervisor can use a virtual machine identifier (VMID) (e.g., 16 bits) to identify a memory space (i.e., an intermediate physical address space) associated with a guest operating system of a virtual machine.

Certain parameters can be associated with different classes of processes or software environments that are available in an architecture, such as a security state with values of secure (S) or non-secure (NS), or an exception level (also called a 'priority level') with values of EL0-EL3 (for a 2-bit exception level), for example.

All or a subset of this context information together constitute a context (also called a "translation context" or a "software context") for a particular virtual address.

A context identifier (CID) can represent either the full context information or partial context information. In some architectures, for example, the full context information can include 35 bits: a 2-bit exception level (EL), a 1-bit non-secure/secure (NS/S) value, a 16-bit VMID, and a 16-bit ASID.

It is to be noted, though, that there can potentially be significant overhead in terms of integrated circuit area devoted to the storage for the data structure that tracks validity for different CIDs. To reduce the overhead, the CID can include partial context information, such as only the 16-bit VMID and the 2-bit EL. Such partial context information can uniquely identify different subsets of contexts. Alternatively, instead of simply concatenating subsets of bits from the full context information, techniques can be used to essentially compress full context information into fewer bits. For example, circuitry that computes the CIDs can be configured to include fewer bits than the full context information, where those bits can be assigned based on a stored mapping between CIDs and a corresponding full context information string.

While the mapping itself takes space on the integrated circuit, more space can be saved in the data structure that tracks validity of different active CIDs. Additional details about techniques for compressing context information can be found, for example, in U.S. Pat. No. 9,779,028, entitled "MANAGING TRANSLATION INVALIDATION," which is incorporated herein by reference.

Figure 4:
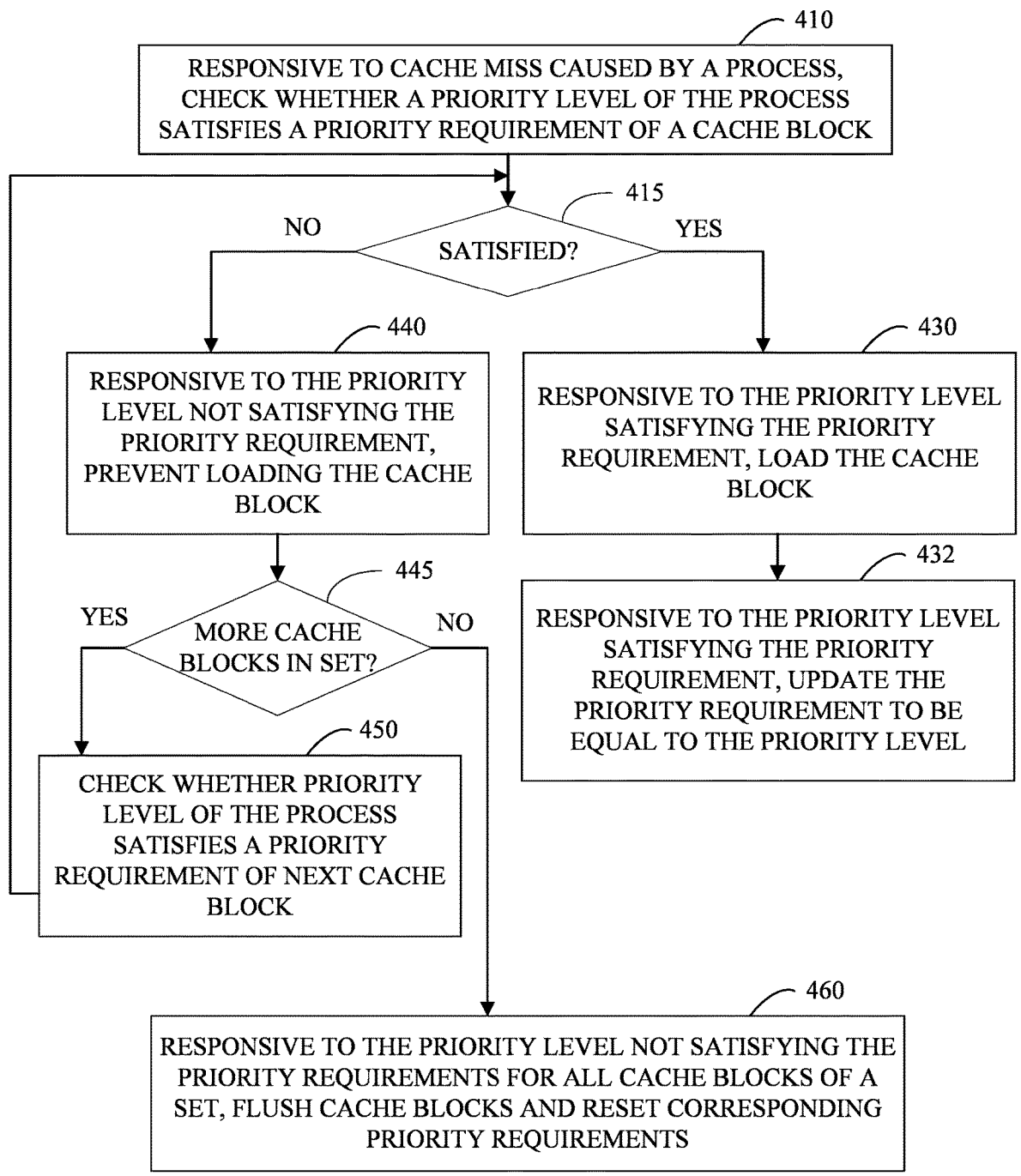
FIG. 4 is a flow chart of an example of a technique for prime and probe attack mitigation.

FIG. 4 is a flow chart of an example of a technique 400 for prime and probe attack mitigation. The technique 400 includes responsive to a cache miss caused by a process, checking 410 whether a priority level of the process satisfies a first priority requirement of a first cache block of a cache with multiple ways including cache blocks associated with respective priority requirements; responsive to the priority level satisfying the first priority requirement, loading 430 the first cache block; and, responsive to the priority level satisfying the first priority requirement, updating 432 the first priority requirement to be equal to the priority level of the process. When the priority level of the process does not satisfy a priority requirement for a cache block, the technique 400 may also include, responsive to the priority level not satisfying the second priority requirement, preventing 440 loading of the second cache block. When the priority level of the process does not satisfy priority requirements for all cache blocks of a set of the cache, the technique 400 may also include, responsive to the priority level not satisfying priority requirements for all cache blocks of a set of the cache, flushing 460 cache blocks of the cache and resetting corresponding priority requirements to indicate low priority. For example, the technique 400 may be implemented using the integrated circuit 101 of FIG. 1. For example, the technique 400 may be implemented using the integrated circuit 600 of FIG. 6.

The technique 400 includes, responsive to a cache miss caused by a process, checking 410 whether a priority level of the process satisfies a priority requirement of a cache block of a cache with multiple ways including cache blocks associated with respective priority requirements. For example, the priority level of the process may be a number stored in a tuple of bits of a data storage circuitry (e.g., a process state register), and the priority requirement may be a number stored in a tuple of bits in a cache entry including the cache block. In some implementations, the priority level of the process satisfies the priority requirement by having a value greater than or equal to a value of the priority requirement. For example, the priority level and the priority requirement may be numbers in the range of allowed right-to-replace priority values (e.g., a number in a range between 0 and 15). For example, the cache block may be part of a cache entry selected from among multiple ways for a set of the cache for loading of instructions or data retrieved from an outer memory system in response to the cache miss.

The priority level (e.g., the right-to-replace priority level 622) of the process may have been set by another process running in the same computing system with a higher priority level (e.g., a hypervisor process or an operating system process) to control access the cache in a way that prevents or mitigates prime an probe attacks from a lower priority process on a higher priority process. For example, the process may be a first process and the technique 400 may be augmented to include updating the priority level of the first process stored in a data storage circuitry based on an instruction of a second process that has a higher priority than the first process. For example, the technique 500 of FIG. 5 may be implemented to update the priority level of the first process stored in a data storage circuitry (e.g., a process state register).

If (at step 415) the priority level satisfies the priority requirement of cache block, then the technique 400 includes, responsive to the priority level satisfying the priority requirement, loading 430 the cache block. In some implementations, the cache is an instruction cache and the cache block is loaded 430 with instructions retrieved from an outer memory system (e.g., via one or more intermediate caches) in response to the cache miss. In some implementations, the cache is a data cache and the cache block is loaded 430 with data retrieved from an outer memory system (e.g., via one or more intermediate caches) in response to the cache miss.

The technique 400 includes, responsive to the priority level satisfying the priority requirement, updating 432 the priority requirement (e.g., the priority requirement 646) to be equal to the priority level of the process. Updating 432 the priority requirement of the cache block to be equal to the priority level of the process may mark the cache block as in use by a process of the priority level and serve to prevent lower priority processes from replacing the data stored in the cache block while the process is using it, and thus may mitigate prime and probe attacks from lower priority processes.

If (at step 415) the priority level does not satisfy the priority requirement of cache block, then the technique 400 includes, responsive to the priority level not satisfying the priority requirement, preventing 440 loading of the cache block. Preventing 440 loading of the cache block may serve to prevent the process from being used to carry out a prime and probe attack on a higher priority process that shares the cache. For example, the higher priority process may have marked the cache block with the priority requirement when loading its data into the cache block.

If (at step 445) there are more cache blocks in the set of the cache implicated by the cache miss, then the technique 400 includes checking 450 whether the priority level of the process satisfies a priority requirement of a next cache block of the cache. The next cache block may be checked 450 in the same way as the first cache block was checked 410.

If (at step 445) there are no more cache blocks in the set of the cache implicated by the cache miss, then the technique 400 includes, responsive to the priority level not satisfying priority requirements for all cache blocks of a set of the cache, flushing 460 cache blocks of the cache and resetting corresponding priority requirements to indicate low priority. In some implementations, all cache blocks of a way of the cache are flushed 460. In some implementations, all cache blocks of the set of the cache are flushed 460. In some implementations, all cache blocks of the cache are flushed 460.

For simplicity of explanation, the technique 400 is depicted and described as a series of blocks, steps, or operations. However, the blocks, steps, or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter. For example, the step 460 may be omitted from the technique 400, and the process may simply refrain from loading the cache with its data for this set in the case where all of the ways for this set are occupied by or reserved for data of higher priority processes. In some implementations, cache flush may instead be performed periodically or on the occurrence of another event, or not at all.

Figure 5:
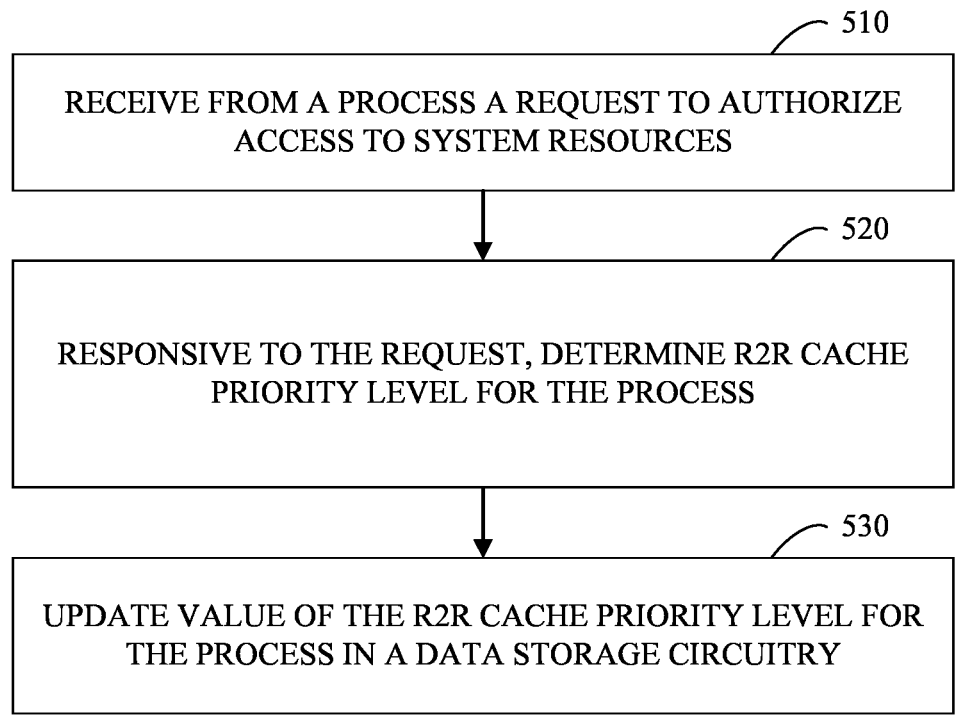
FIG. 5 is a flow chart of an example of a technique for updating a right-to-replace priority level for a process using a higher priority process.

FIG. 5 is a flow chart of an example of a technique 500 for updating a right-to-replace priority level for a process using a higher priority process. The technique 500 includes receiving 510 from a process a request to authorize access to system resources; responsive to the request, determining 520 a right-to-replace cache priority level for the process; and updating 530 a value of the right-to-replace cache priority level (e.g., the right-to-replace priority level 622) based on the determination 520. In some implementations, the requesting process is a first process and updating 530 the priority level of the first process stored in a data storage circuitry (e.g., the data storage circuitry 620) based on an instruction of a second process that has a higher priority than the first process. For example, the value of the right-to-replace cache priority level may be updated 530 using a specialized instruction and/or by writing to a register of an integrated circuit with restricted write permissions. For example, the technique 500 may be implemented by a high priority process (e.g., a hypervisor process or an operating system process) that runs on an integrated circuit (e.g., the integrated circuit 101 or the integrated circuit 600) and is used to manage access to hardware resources of the integrated circuit. A process seeking to utilize hardware resources of the system may send the request (e.g., using a system call function causing an inter-process communication). In some implementations, the high priority process may respond with a message back to the process that either confirms grant of the request or denies the request. In some implementations, the high priority process does not provide any feedback to the process indicating whether the request has been granted, which may serve to thwart some malicious processes. For example, the technique 400 may be implemented using the integrated circuit 101 of FIG. 1. For example, the technique 400 may be implemented using the integrated circuit 600 of FIG. 6.

Figure 6:
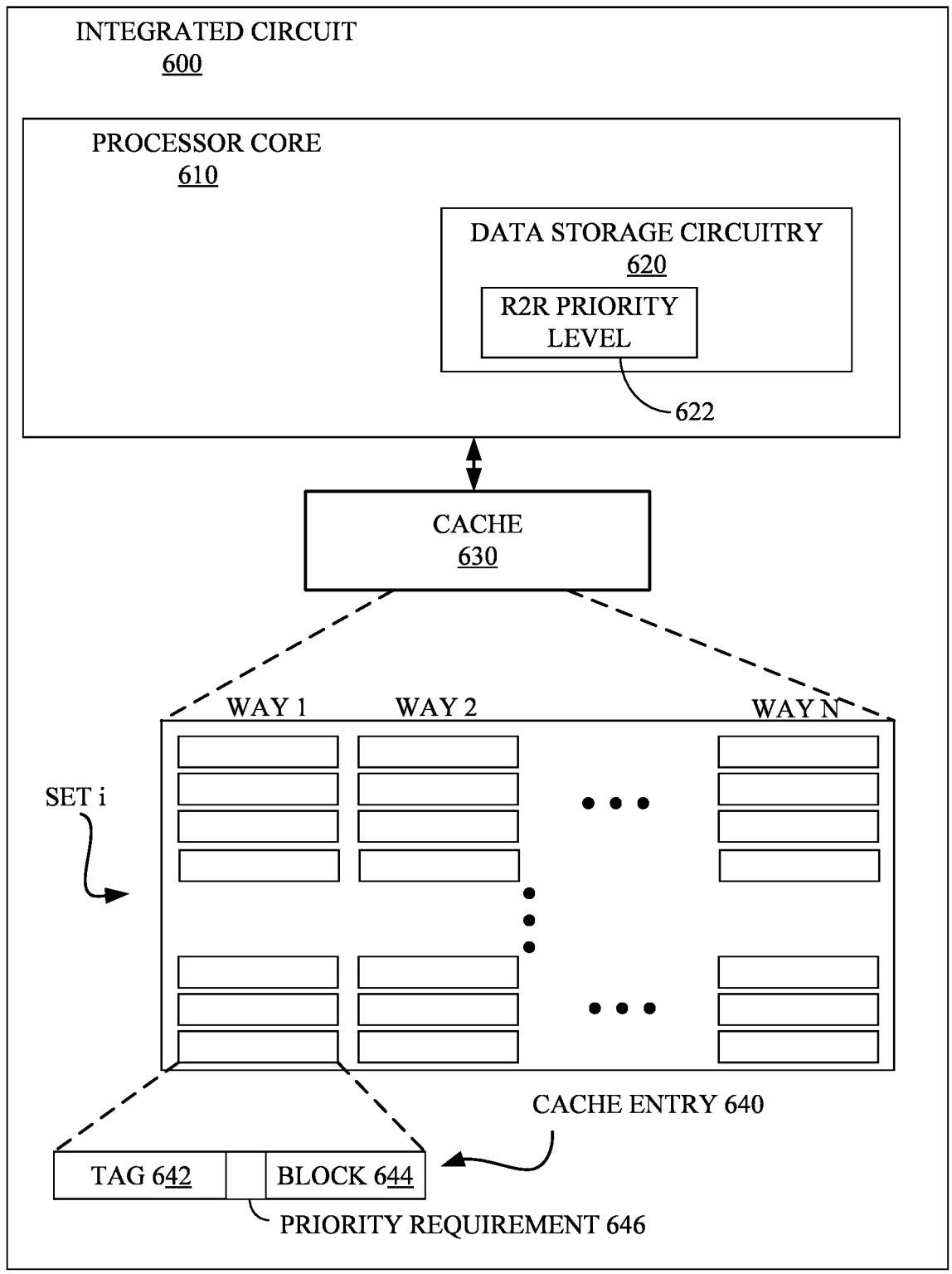
FIG. 6 is a block diagram of an example of an integrated circuit for executing instructions with prime and probe attack mitigation.

FIG. 6 is a block diagram of an example of an integrated circuit 600 for executing instructions with prime and probe attack mitigation. The integrated circuit 600 includes a processor core 610 that includes a data storage circuitry 620 storing a right-to-replace priority level 622. The integrated circuit 600 includes a cache 630 that is used by the processor core to access an outer memory system. The cache 630 may be a set associative cache the includes multiple ways. The cache 630 includes cache entries, including the cache entry 640. The cache entry 640 includes a cache tag 642, a cache block 644 and a priority requirement 646. The priority requirement 646 is associated with the cache block 644, and may control which processes (i.e., processes with right-to-replace priority levels satisfying the priority requirement 646) may load data into the cache block 644. This architecture may serve to mitigate some prime and probe attacks by lower priority processes. For example, the integrated circuit 600 may be used to implement the technique 400 of FIG. 4.

The integrated circuit 600 includes a cache 630 with multiple ways including cache blocks (e.g., the cache block 644) associated with respective priority requirements (e.g., the priority requirement 646). For example, and the priority requirement 646 may be a number stored in a tuple of bits in the cache entry 640 including the cache block 644. In some implementations, the priority requirement 646 is a number in a range of available right-to-replace priority levels (e.g., 0 to 3, 0 to 7, or 0 to 15). In the example of FIG. 6, the priority requirement 646 associated with a cache block 644 is stored in the cache 630 along with the cache block 644. In some implementations (not shown in FIG. 6), a priority requirement associated with a cache block may be stored outside of the cache 630, such in a separate data storage circuitry (e.g., a register or register file) storing an array of priority requirements for respective cache blocks of the cache 630.

In the example of FIG. 6, the cache 630 is outside of the processor core 610 (e.g., an ARM processor core or an x86 processor core). For example, the cache 630 may be an L2 cache or an L3 cache. In some implementations (not shown in FIG. 6), the cache 630 is an L1 cache (e.g., the L1 cache 301) of a processor core 610 of the integrated circuit. For example, the cache may be an instruction cache or a data cache.

The integrated circuit 600 includes a data storage circuitry 620 configured to store a priority level 622 of a process. For example, the data storage circuitry 620 may be a process state register storing a state of the process. The data storage circuitry 620 may include a set of one or more flip-flops or latches for storing data. In some implementations, the priority level of the process is a number stored in a tuple of bits of the data storage circuitry 620. For example, the priority level 622 may be a number in a range of available right-to-replace priority levels (e.g., 0 to 3, 0 to 7, or 0 to 15).

For example, the priority level 622 for a process may be set by a higher priority process that is responsible for managing access to computing resources of the integrated circuit 600. In some implementations, the process is a first process and the integrated circuit is configured to update the priority level 622 of the first process stored in the data storage circuitry 620 based on an instruction of a second process that has a higher priority than the first process. For example, the second process may be a hypervisor process. For example, the second process is an operating system process. For example, the technique 500 may be implemented by the second process to update the priority level 622 of the first process.

The integrated circuit 600 may be configured to, responsive to a cache miss caused by the process, check whether the priority level 622 of the process satisfies a first priority requirement 646 of a first cache block 644 of the cache 630; responsive to the priority level 622 satisfying the first priority requirement 646, load the first cache block 644; and, responsive to the priority level 622 satisfying the first priority requirement 646, update the first priority requirement 646 to be equal to the priority level 622 of the process. For example, the first cache block 644 may be loaded with instructions or other data retrieved from an outer memory system (e.g., via one or more intermediate caches) in response to the cache miss. The integrated circuit 600 may be further configured to, responsive to a second cache miss caused by the process, check whether the priority level 622 of the process satisfies a second priority requirement of a second cache block of the cache; and, responsive to the priority level 622 not satisfying the second priority requirement, prevent loading of the second cache block.

The integrated circuit 600 may be configured to, responsive to a cache miss caused by the process, check whether the priority level 622 of the process satisfies a first priority requirement 646 of a first cache block 644 of the cache 630; and, responsive to the priority level 622 not satisfying the first priority requirement 646, prevent loading of the first cache block 644.

For example, the priority level 622 of the process is a number stored in a tuple of bits of the data storage circuitry 620, and the first priority requirement 646 is a number stored in a tuple of bits in a cache entry 640 including the first cache block 644. In some implementations, the priority level 622 of the process satisfies the first priority requirement 646 by having a value greater than or equal to a value of the first priority requirement 646.

Over time, one or more high priority processes may come to dominate the ways of a set in the cache 630, which reduce performance of lower priority processes. In some implementations, the integrated circuit 600 may detect when a process is being shut out of using a set of the cache 630 and, perform a complete or partial flush of the cache 630 to free up resources for low priority threads. For example, the integrated circuit 600 may be configured to, responsive to the priority level 622 not satisfying priority requirements for all cache blocks of a set of the cache 630, flush cache blocks of the cache 630 and reset corresponding priority requirements to indicate low priority. In some implementations, all cache blocks of a way of the cache 630 are flushed. In some implementations, all cache blocks of the set of the cache 630 are flushed. In some implementations, all cache blocks of the set of the cache 630 are flushed.

For simplicity of explanation, the technique 400 is depicted and described as a series of blocks, steps, or operations. However, the blocks, steps, or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

The word "example" is used herein to mean serving as an example, instance, or illustration. Any aspect or design described herein as "example" is not necessarily to be construed as being preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise or clearly indicated otherwise by the context, the statement "X includes A or B" is intended to mean any of the natural inclusive permutations thereof. That is, if X includes A; X includes B; or X includes both A and B, then "X includes A or B" is satisfied under any of the foregoing instances. In addition, the articles "a" and "an" as used in this application and the appended claims should generally be construed to mean "one or more," unless specified otherwise or clearly indicated by the context to be directed to a singular form. Moreover, use of the term "an implementation" or the term "one implementation" throughout this disclosure is not intended to mean the same implementation unless described as such.

Implementations of the integrated circuit 101 (and the algorithms, methods, instructions, etc., stored thereon and/or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

Further, all or a portion of implementations of this disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or semiconductor device. Other suitable mediums are also available.

The above-described implementations and other aspects have been described in order to facilitate easy understanding of this disclosure and do not limit this disclosure. On the contrary, this disclosure is intended to cover various modifications and equivalent arrangements included within the scope of the appended claims, which scope is to be accorded the broadest interpretation as is permitted under the law so as to encompass all such modifications and equivalent arrangements.

What is claimed is:

1. An integrated circuit for executing instructions, comprising:
   a set associative cache comprising multiple sets with each set comprising cache entries each associated with a respective way of multiple ways, and with the cache entries including storage for cache blocks and storage for respective priority requirements associated with cache blocks to be stored in the entries, where the priority requirement associated with a cache block controls which individual processes have a right to replace the cache block based on priority levels of the individual processes;
   a data storage circuitry configured to store a priority level of a process; and
   in which the integrated circuit is configured to:
      responsive to a cache miss caused by the process requesting an address in a first cache block, check whether the priority level of the process satisfies a first priority requirement of the first cache block;
      responsive to the priority level satisfying the first priority requirement, load the first cache block into a cache entry, replacing any previously stored cache block in the cache entry: and
      responsive to the priority level satisfying the first priority requirement, update the first priority requirement, preventing lower priority processes from replacing the first cache block while the process is using the first cache block.

2. The integrated circuit of claim 1, in which the integrated circuit is configured to:
   check whether the priority level of the process satisfies a second priority requirement of a second cache block; and
   responsive to the priority level not satisfying the second priority requirement, prevent loading of the second cache block into a cache entry.

3. The integrated circuit of claim 1, in which the priority level of the process is a number stored in a tuple of bits of the data storage circuitry, and the first priority requirement is a number stored in a tuple of bits in a cache entry including the first cache block.

4. The integrated circuit of claim 3, in which the priority level of the process satisfies the first priority requirement by having a value greater than or equal to a value of the first priority requirement.

5. The integrated circuit of claim 1, in which the process is a first process and the integrated circuit is configured to update the priority level of the first process stored in the data storage circuitry based on an instruction of a second process that has a higher priority than the first process.

6. The integrated circuit of claim 5, in which the second process is a hypervisor process.

7. The integrated circuit of claim 5, in which the second process is an operating system process.

8. The integrated circuit of claim 1, in which the integrated circuit is configured to:
   responsive to the priority level not satisfying priority requirements for all cache blocks of a first set of the multiple sets indexed by an index portion of a virtual address associated with the first cache block, flush a plurality of cache blocks of the cache and reset corresponding priority requirements associated with at least the plurality of cache blocks to indicate low priority.

9. The integrated circuit of claim 8, in which the plurality of cache blocks comprise all cache blocks of a way of the multiple ways.

10. The integrated circuit of claim 8, in which the plurality of cache blocks comprise all cache blocks of the first set of the multiple sets.

11. The integrated circuit of claim 1, in which the cache is an L1 cache of a processor core of the integrated circuit.

12. The integrated circuit of claim 1, in which the data storage circuitry is a process state register storing a state of the process.

13. A method comprising:
   responsive to a cache miss caused by a process requesting an address in a first cache block, checking whether a priority level of the process satisfies a first priority requirement of the first cache block being requested from a set associative cache comprising multiple sets with each set comprising cache entries each associated with a respective way of multiple ways, and with the cache entries including storage for cache blocks and storage for respective priority requirements associated with cache blocks to be stored in the entries, where the priority requirement associated with a cache block controls which individual processes have a right to replace the cache block based on priority levels of the individual processes;
   responsive to the priority level satisfying the first priority requirement, loading the first cache block into a cache entry, replacing any previously stored cache block in the cache entry; and
   responsive to the priority level satisfying the first priority requirement, updating the first priority requirement, preventing lower priority processes from replacing the first cache block while the process is using the first cache block.

14. The method of claim 13, comprising:

checking whether the priority level of the process satisfies a second priority requirement of a second cache block; and responsive to the priority level not satisfying the second priority requirement, preventing loading of the second cache block into a cache entry.

15. The method of claim 13, in which the priority level of the process is a number stored in a tuple of bits of a data storage circuitry, and the first priority requirement is a number stored in a tuple of bits in a cache entry including the first cache block.

16. The method of claim 15, in which the priority level of the process satisfies the first priority requirement by having a value greater than or equal to a value of the first priority requirement.

17. The method of claim 13, in which the process is a first process and further comprising: updating the priority level of the first process stored in a data storage circuitry based on an instruction of a second process that has a higher priority than the first process.

18. The method of claim 17, in which the second process is a hypervisor process.

19. The method of claim 17, in which the second process is an operating system process.

20. The method of claim 13, comprising:

responsive to the priority level not satisfying priority requirements for all cache blocks of a first set of the multiple sets indexed by an index portion of a virtual address associated with the first cache block, flushing a plurality of cache blocks of the cache and resetting corresponding priority requirements associated with at least the plurality of cache blocks to indicate low priority.

21. The method of claim 20, in which the plurality of cache blocks comprise all cache blocks of a way of the multiple ways.

22. The method of claim 20, in which the plurality of cache blocks comprise all cache blocks of the first set of the multiple sets.

* * * * *